(12) United States Patent
Remes (10) Patent No.: US 9,914,486 B2
(45) Date of Patent: Mar. 13, 2018

(54) HOOD ASSEMBLY INCORPORATING A FLUID RESERVOIR

(71) Applicant: FORD GLOBAL TECHNOLOGIES, LLC, Dearborn, MI (US)

(72) Inventor: Enrique Remes, Huixquilucan (MX)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/204,122

(22) Filed: Jul. 7, 2016

(65) Prior Publication Data

US 2018/0009484 A1    Jan. 11, 2018

(51) Int. Cl.
*B60J 7/00*     (2006.01)
*B62D 25/12*    (2006.01)
*B60S 1/50*     (2006.01)

(52) U.S. Cl.
CPC ............... *B62D 25/12* (2013.01); *B60S 1/50* (2013.01)

(58) Field of Classification Search
CPC . A63H 17/26; B60K 2350/1052; A61L 9/125; A61L 9/127; A62B 17/04; A61M 5/14248; A61M 5/162; A61M 39/12; A61M 2005/1623; A61M 2039/0072
USPC .................................................... 296/193.11
See application file for complete search history.

(56) References Cited

U.S. PATENT DOCUMENTS

| | | | |
|---|---|---|---|
| 5,024,383 A * | 6/1991 | Vaschetto | B60S 1/50 239/284.1 |
| 5,277,656 A | 1/1994 | Koukal et al. | |
| 6,056,075 A * | 5/2000 | Kargilis | B62D 25/105 180/68.1 |
| 2004/0142232 A1 | 7/2004 | Risca et al. | |
| 2006/0244288 A1 * | 11/2006 | Sandhu | B60S 1/50 296/192 |
| 2013/0175827 A1 * | 7/2013 | Hashimoto | B60R 21/34 296/193.11 |
| 2013/0241241 A1 * | 9/2013 | Sekikawa | B60R 21/34 296/193.11 |
| 2014/0015285 A1 * | 1/2014 | Ishitobi | B62D 25/105 296/193.11 |
| 2017/0137000 A1 * | 5/2017 | Huebner | B62D 25/08 |
| 2017/0225658 A1 * | 8/2017 | Quintero Perez | B60S 1/481 |

FOREIGN PATENT DOCUMENTS

| | | |
|---|---|---|
| DE | 4123947 A1 | 1/1993 |
| DE | 19546085 C1 | 6/1997 |
| DE | 102005059264 A1 | 7/2007 |
| EP | 1669280 A1 | 6/2006 |

OTHER PUBLICATIONS

English Machine Translation of DE102005059264A1.
English Machine Translation of DE4123947A1.
English Machine Translation of DE19546085C1.
English Machine Translation of EP1669280A1.

* cited by examiner

*Primary Examiner* — Kiran B Patel
(74) *Attorney, Agent, or Firm* — Jason Rogers; King & Schickli, PLLC (57) ABSTRACT

A motor vehicle hood assembly includes a hood shell and a fluid reservoir having a body including a stringer section and a plurality of finger sections that are connected to and extend from the stringer section. The fluid reservoir may be provided packaged between the hood shell and an insulation layer of the hood assembly. A filling port is provided to assure the fluid is replenished by gravity once it's emptied from the reservoir.

11 Claims, 7 Drawing Sheets

HOOD ASSEMBLY INCORPORATING A FLUID RESERVOIR

TECHNICAL FIELD

This document relates generally to the motor vehicle equipment field and, more particularly, to a hood assembly incorporating a fluid reservoir as well as to a fluid reservoir having a body including a stringer section and a plurality of finger sections.

BACKGROUND

For many years now, motor vehicle manufacturers have equipped motor vehicles with a washer fluid reservoir that stores washer fluid for cleaning the windshield of a motor vehicle. Such a reservoir may also be utilized to clean the headlamps on some motor vehicles.

Such a washer fluid reservoir occupies useful space in an already crowded engine compartment. This document relates to a hood assembly that incorporates the washer fluid reservoir. More specifically, the washer fluid reservoir is carried against the inner surface of the hood shell. Such a reservoir is thin enough so as to not intrude substantially into the engine compartment. Further, the fluid reservoir has a body that is shaped to minimize the production of waves during motor vehicle operation and thereby reduce the sloshing of fluid in the washer reservoir.

SUMMARY

In accordance with the purposes and benefits described herein, a hood assembly is provided for a motor vehicle. That hood assembly comprises a hood shell and a fluid reservoir having a body including a stringer section and a plurality of finger sections connected to and extending from the stringer section. An insulation layer may be carried on the hood shell and the fluid reservoir may be packaged between the hood shell and the insulation layer.

The body may define a fluid retention cavity that extends uninterrupted through the stringer section and the plurality of finger sections. Further, the body may include a filler port wall defining a fill port or fill spout.

In some embodiments the hood includes an opening and the filler port wall extends into the opening. Further, the fluid reservoir may include a removable cap that is secured to the filler port wall and closes the fill port.

In some embodiments the plurality of finger sections all extend in a first direction from the stringer section. That first direction may extend along a longitudinal axis of the hood shell. Alternatively, that first direction may extend along a lateral axis of the hood shell.

In some embodiments the plurality of finger sections may include a first group of finger sections extending in a first direction from the stringer section and a second group of finger sections extending in a second direction from the stringer section.

In accordance with an additional aspect, the hood assembly for a motor vehicle comprises a hood shell, an insulation layer carried on the hood shell and a fluid reservoir packaged between the hood shell and the insulation layer. That fluid reservoir may include a fill spout extending through the insulation layer. Further, a removable cap may be provided for closing the fill spout.

In accordance with still another aspect, a fluid reservoir is provided. That fluid reservoir comprises a body including a stringer section and a plurality of finger sections connected to and extending from the stringer section. The body defines a hollow cavity that extends continuously through the stringer section and the plurality of finger sections.

The body further includes a filler port wall defining a fill port. A removable cap may be provided for closing the fill port.

The plurality of finger sections may extend in a first direction from the stringer section. Alternatively, the plurality of fingers sections may include a first group of finger sections extending in a first direction from the stringer section and a second group of finger sections extending in a second direction from the stringer section.

In the following description, there are shown and described several preferred embodiments of the hood assembly and the fluid reservoir. As it should be realized, the hood assembly and the fluid reservoir are capable of other, different embodiments and their several details are capable of modification in various, obvious aspects all without departing from the hood assembly and the fluid reservoir as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the hood assembly and fluid reservoir and together with the description serve to explain certain principles thereof. In the drawing figures.

Reference will now be made in detail to the present preferred embodiments of the hood assembly and fluid reservoir, examples of which are illustrated in the accompanying drawing figures.

DETAILED DESCRIPTION

Figure 1:
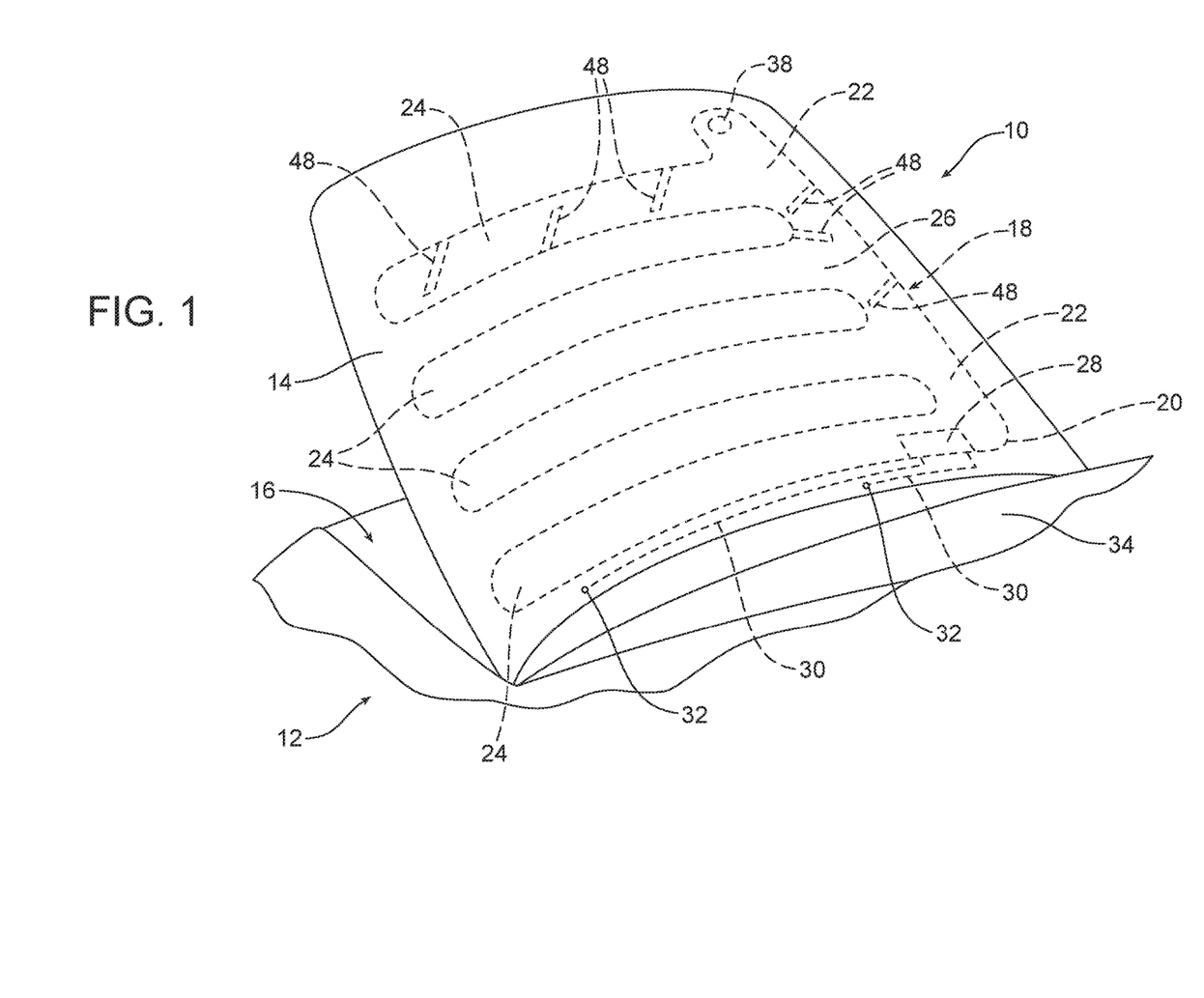
FIG. 1 is a perspective view of a motor vehicle incorporating the hood assembly with the fluid reservoir.

Reference is now made to FIG. 1 illustrating a first embodiment of the hood assembly 10 that is mounted by means of a hinge assembly (not shown) to the motor vehicle 12. As illustrated in FIG. 1, the hood assembly 10 is in a raised position.

The hood assembly 10 includes a hood shell 14. The hood shell 14 may be stamped from a sheet metal material. When the hood assembly 10 is closed, the hood shell 14 functions as a cover for the engine bay 16 while providing aerodynamic benefits, structural integrity and design appeal to the motor vehicle 12.

The hood assembly 10 also includes a fluid reservoir 18. In the illustrated embodiment, the fluid reservoir 18 is designed to hold washer fluid.

Figure 1A:
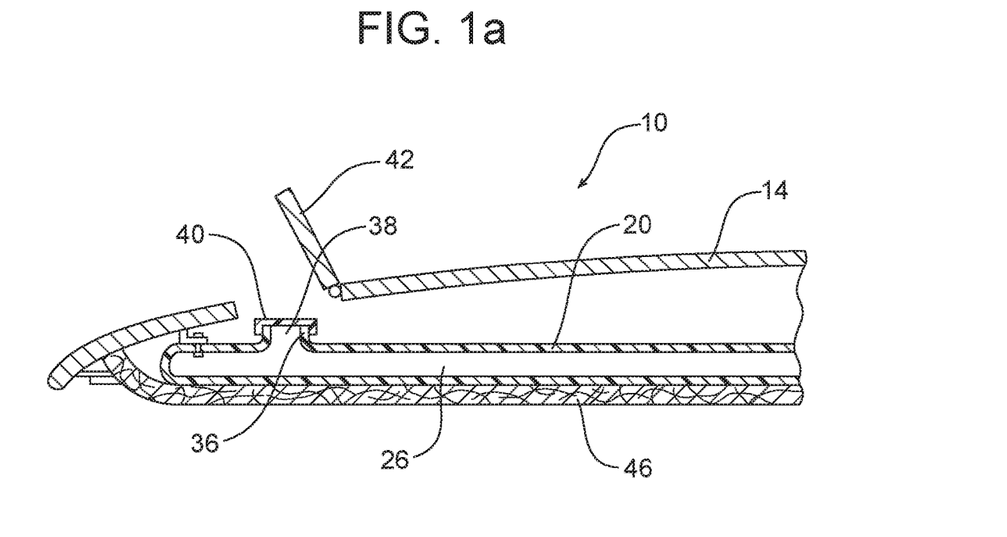
FIG. 1a is a schematic, detailed cross-sectional view illustrating a fill port arrangement for allowing one to fill the fluid reservoir contained in the hood assembly between the hood shell and insulation layer.
Figure 3:
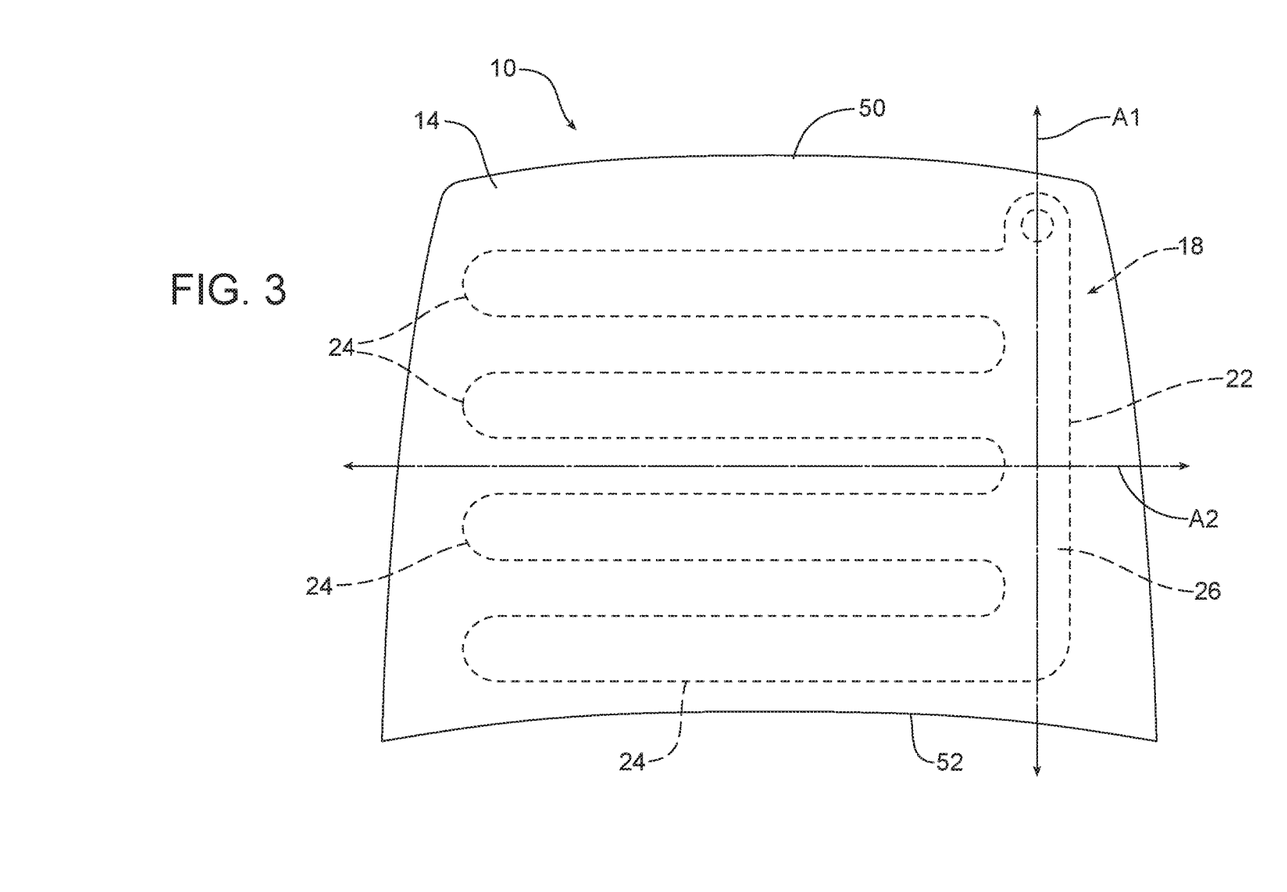
FIGS. 3-6 are schematic illustrations of various embodiments of the fluid reservoir showing different stringer and finger arrangements.

In the embodiment illustrated in FIGS. 1, 1a and 3, the fluid reservoir 18 has a body 20 that includes a stringer section 22. A plurality of finger sections 24 are connected to and extend from the stringer section 22. Here it should be appreciated that the body 20 defines a fluid retention cavity 26 that extends uninterrupted through the stringer section 22 and the plurality of finger sections 24.

A washer fluid pump 28 is carried on the hood shell 14. The washer fluid pump 28 functions to pump washer fluid from the fluid retention cavity 26 in the fluid reservoir 18 through the feed lines 30 to the spray jets 32 which direct that washer fluid onto the windshield 34 of the motor vehicle 12 when an operator desires to clean the windshield. This may be done by manipulating an appropriate actuator (not shown) in the motor vehicle passenger compartment in a manner known in the art.

As best illustrated in FIGS. 1 and 1a, the fluid reservoir 18 includes a filler port wall 36 that forms a fill port or fill spout 38. A removable cap 40 closes the fill port 38. In the embodiment illustrated in FIG. 1a, the fill port 38 opens toward the hood shell 14. The hood shell 14 includes a filler door 42 connected by means of a hinge assembly 44 to the hood shell.

When one wishes to add washer fluid to the fluid reservoir 18, one opens the filler door 42 as illustrated in FIG. 1a. Next, the individual removes the removable cap 40 from the filler port wall 36 in order to open the fill port 38. Fluid is then poured into the fill port 38 when the hood 10 is in the raised position illustrated in FIG. 1. That fluid then flows by gravity, filling the stringer section 22 and the finger sections 24. After filling with washer fluid, the removable cap 40 is again secured on the filler port wall 36 and secured in position so as to close the fill port 38. The connection between the removable cap 40 and the filler port wall 36 may be by means of cooperating threads or other appropriate means.

As further illustrated in FIG. 1a, the hood assembly 10 may also include an insulation layer 46. That insulation layer 46 may be made from any appropriate material having sound and/or temperature insulating properties. As illustrated, the fluid reservoir 18 is packaged between the hood shell 14 and the insulation layer 46.

Figure 2:
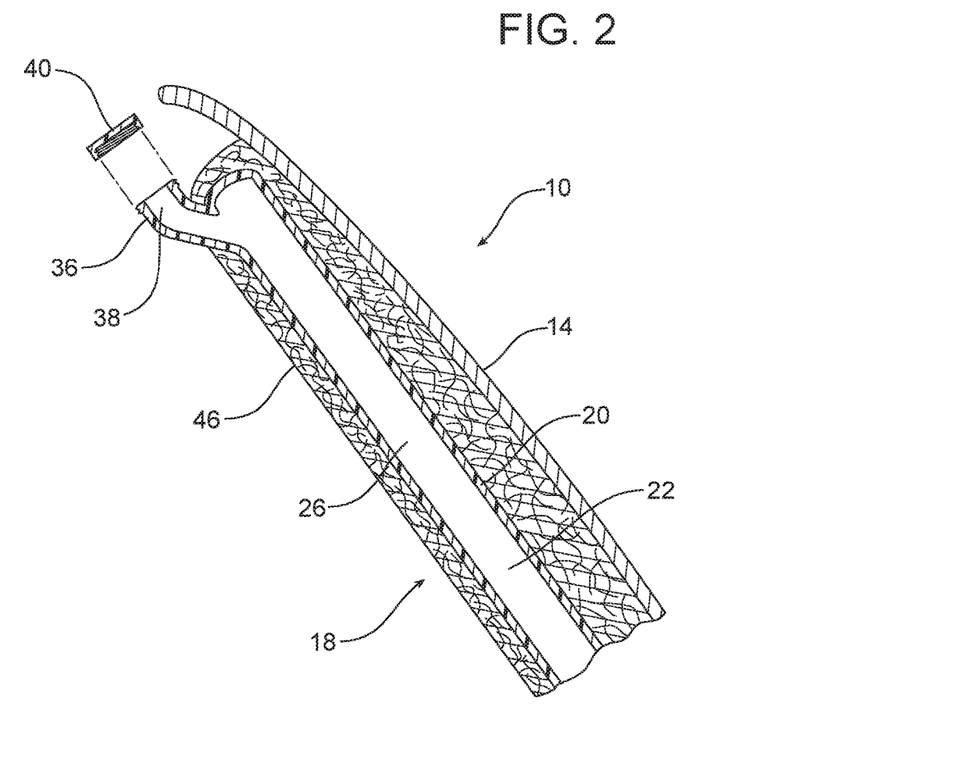
FIG. 2 is a detailed schematic view illustrating an alternative embodiment wherein the fill spout extends through the insulation layer of the fluid assembly on the inside of the hood shell.

In an alternative embodiment illustrated in FIG. 2, the filler port wall 36 extends through the insulation layer 46 at the rear of the hood shell 14. When the hood assembly 10 is raised as illustrated in FIG. 2, the removable cap 40 is easily accessible. Once removed as illustrated in FIG. 2, the fill port 38 is opened and held at a useful angle for one to pour washer fluid into the fill port 38. That washer fluid then flows down through the filler port wall 36 into the stringer section 22 of the fluid reservoir 18 where it can fill the stringer section and the finger sections 24 in communication therewith.

The plurality of finger sections 24 provided in the fluid reservoir may be shaped and oriented in an appropriate manner to minimize the generation of waves in the washer fluid so as to thereby reduce sloshing of the washer fluid in the fluid reservoir 18 during motor vehicle operation. Of course, if desired, it should be appreciated that baffles 48 of appropriate size and shape may be provided in the fluid retention cavity 26 along the stringer section 22 and/or along one or more of the finger sections 24 as illustrated in FIG. 1.

Reference is now made to FIGS. 3-6 illustrating various embodiments of the fluid reservoir 18. The embodiment illustrated in FIG. 3 is consistent with that illustrated in FIG. 1. In this embodiment, the fluid reservoir 18 includes a stringer section 22 that extends along or parallel to a longitudinal axis A1 of the hood assembly 10 from the front end 50 to the rear end 52. The plurality of finger sections 24 extend in a first direction from the stringer section 22 and are aligned with the lateral axis A2 of the hood assembly 10. Four finger sections 24 are illustrated in FIG. 3. It should be appreciated that fewer or more finger sections may be provided if desired.

Figure 4:
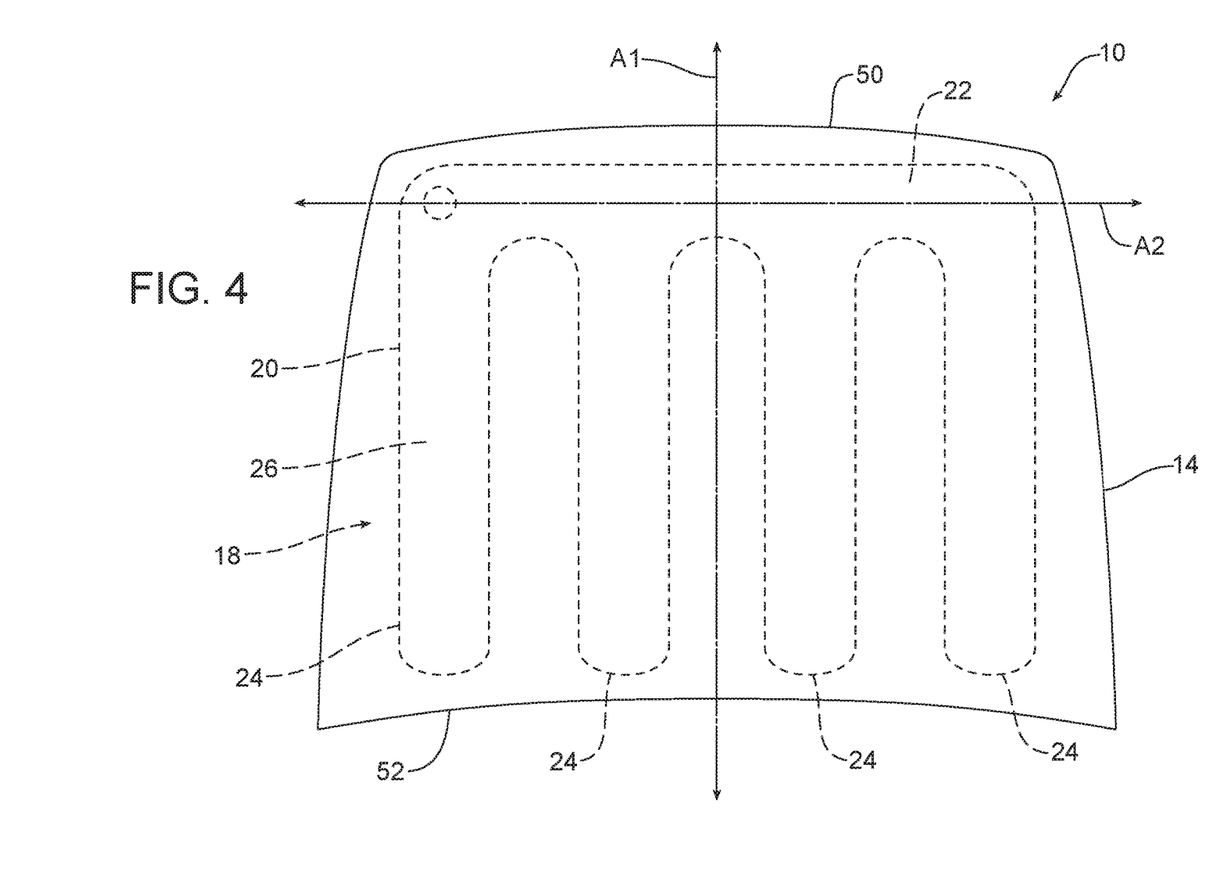

In the embodiment illustrated in FIG. 4, the stringer section 22 extends laterally across the hood assembly 10 near the front end 50. Four finger sections 24 extend in a first direction from the stringer section 22. That direction is aligned with the longitudinal axis A1 of the hood assembly. In the embodiment illustrated in FIG. 4, there are four finger sections 22. It should be appreciated that a greater or smaller number of finger sections may be provided if desire and in order to better control washer fluid sloshing.

Figure 5:
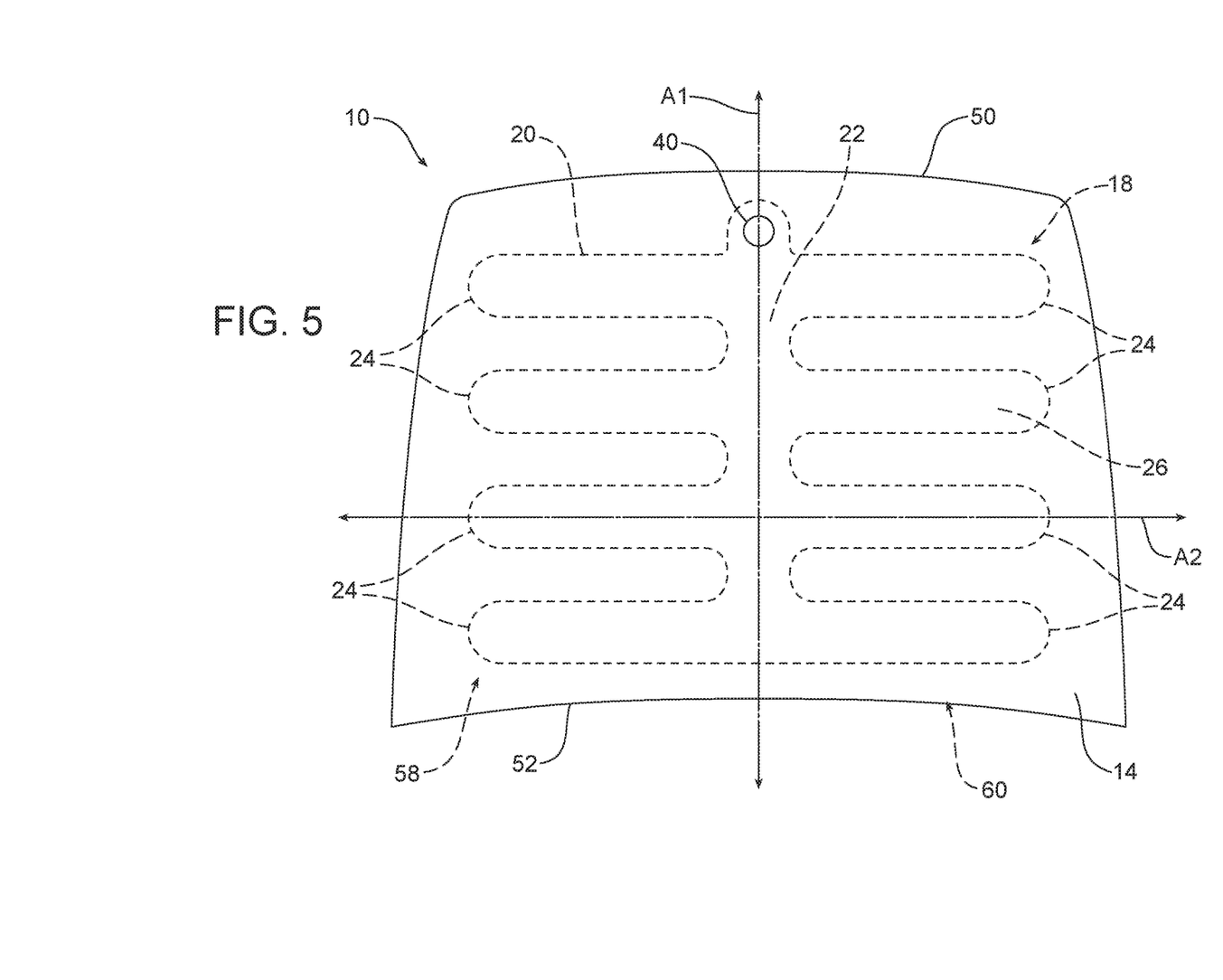

As illustrated in FIG. 5, the fluid reservoir 18 includes a body 20 with a stringer section 22, a first group 58 of finger sections 24 extending in a first direction from the stringer section and a second group 60 of finger sections extending in a second direction from the stringer section. In the illustrated embodiment, the stringer section 22 extends down the center of the hood assembly 10 along the longitudinal axis A1 while the finger sections 24 all extend laterally across the hood assembly parallel to the lateral axis A2. In this embodiment, the fill cap 40 extends through the hood shell 14 and may serve a dual function as a motor vehicle badge.

Figure 6:
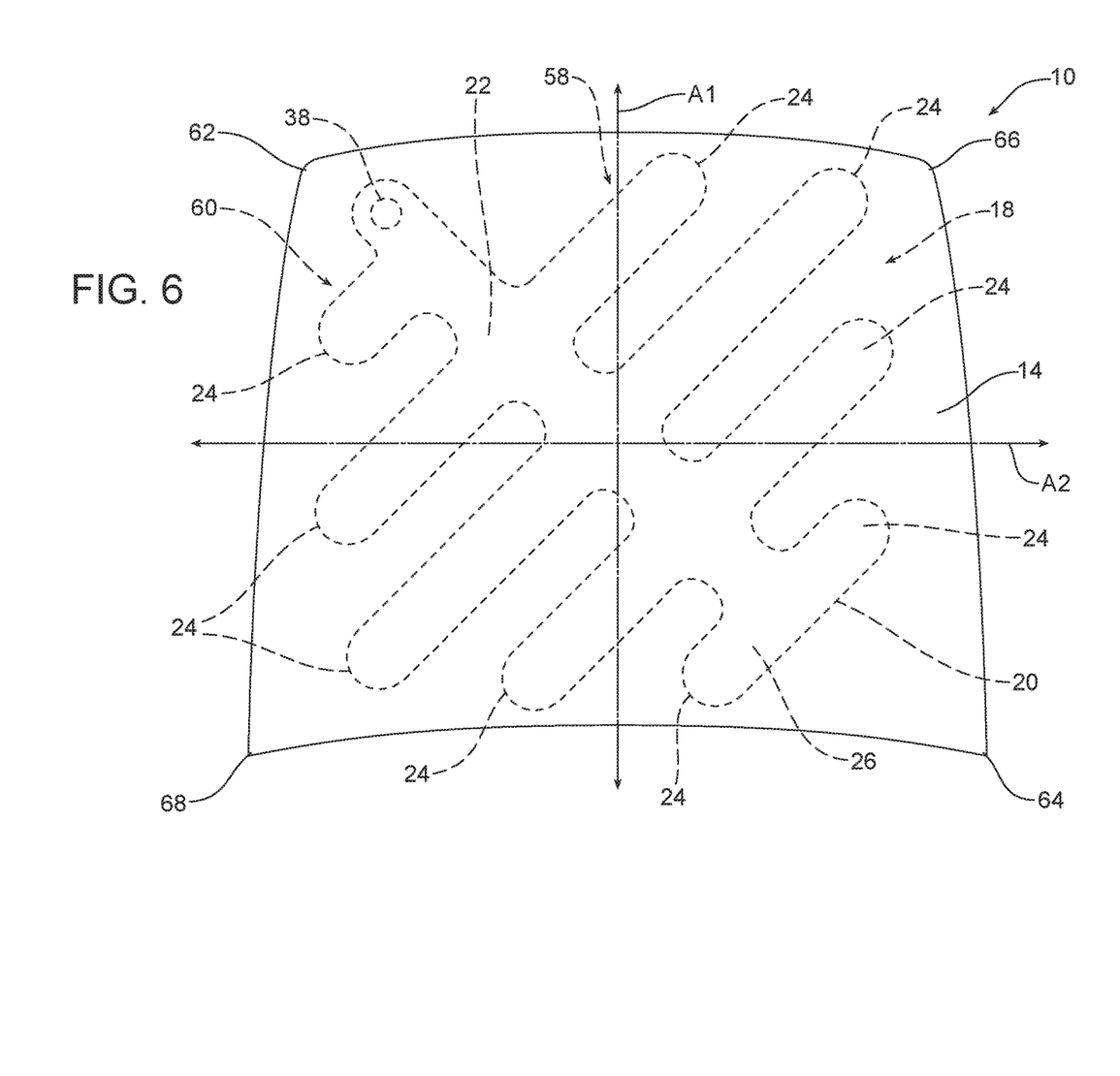

In the embodiment illustrated in FIG. 6, the fluid reservoir 18 includes a stringer section 22 that extends from the front left corner 62 toward the right rear corner 64 of the hood assembly 10. The first group 58 of finger sections 24 extends toward the front right corner 66 while the second group 60 of finger sections extends toward the left rear corner 68 of the hood assembly 10. In this embodiment, both the stringer section 22 and the finger sections 24 extend at a bias to the lateral axis 54 and the longitudinal axis 56.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A hood assembly for a motor vehicle, comprising:
a hood shell; and
a fluid reservoir having a body including a stringer section and a plurality of finger sections connected to and extending from said stringer section.

2. The hood assembly of claim 1, further including an insulation layer carried on said hood shell.

3. The hood assembly of claim 2, wherein said fluid reservoir is packaged between said hood shell and said insulation layer.

4. The hood assembly of claim 3, wherein said body defines a fluid retention cavity that extends uninterrupted through said stringer section and said plurality of finger sections.

5. The hood assembly of claim 4, wherein said body further includes a filler port wall defining a fill port.

6. The hood assembly of claim 5, wherein said hood shell includes an opening and said filler port wall extends into said opening.

7. The hood assembly of claim 6, wherein said fluid reservoir further includes a removable cap secured to said filler port wall and closing said fill port.

8. The hood assembly of claim 7, wherein said plurality of finger sections all extend in a first direction from said stringer section.

9. The hood assembly of claim 8, wherein said first direction extends along a longitudinal axis of said hood shell.

10. The hood assembly of claim 8, wherein said first direction extends along a lateral axis of said hood shell.

11. The hood assembly of claim 7, wherein said plurality of finger sections includes a first group of finger sections extending in a first direction from said stringer section and a second group of finger sections extending in a second direction from said stringer section.

\* \* \* \* \*